Oct. 9, 1923.
F. R. CORNWALL
MONORAIL SYSTEM
Filed Feb. 17, 1922
1,469,997
4 Sheets-Sheet 2
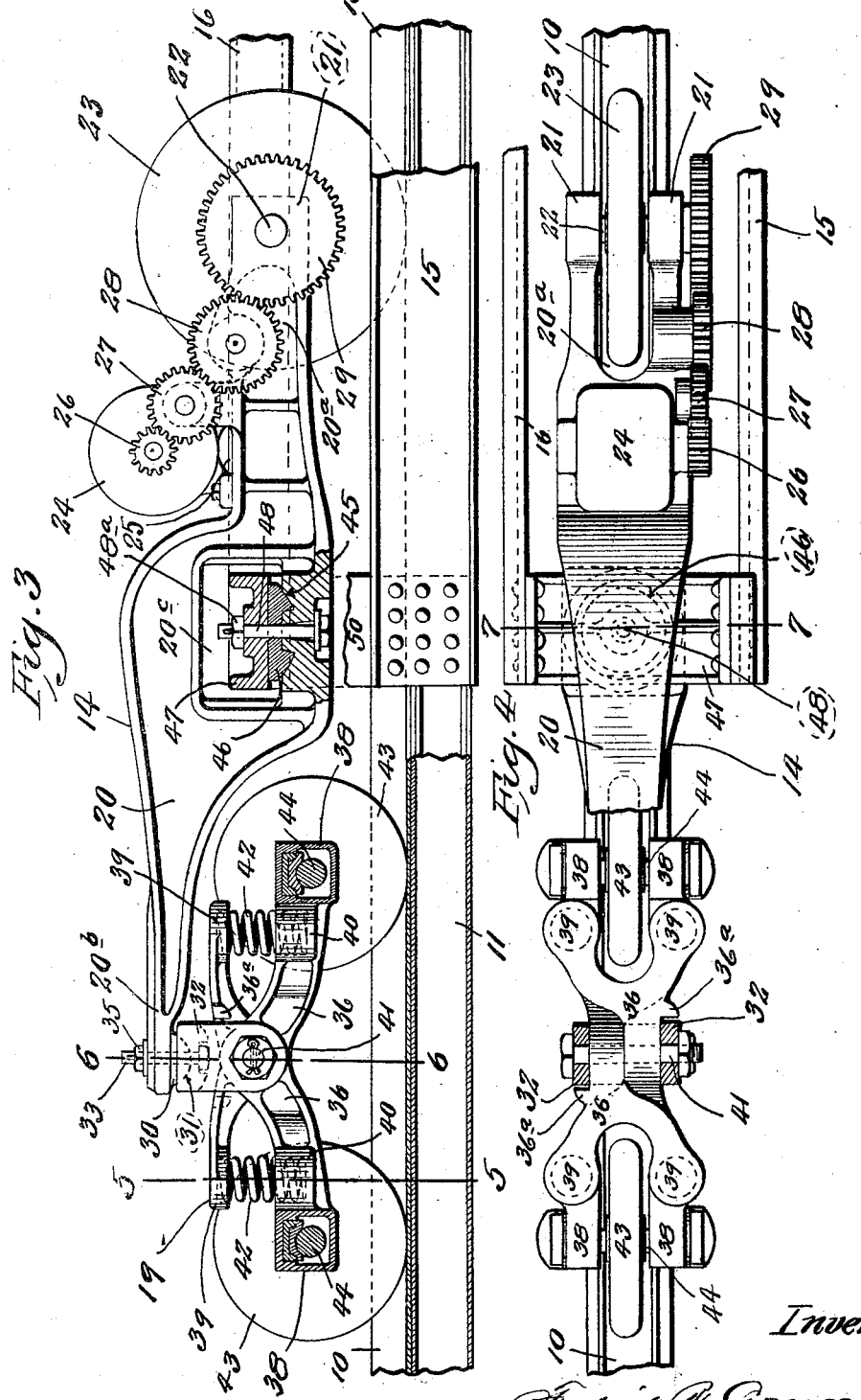
Inventor
Frederick R. Cornwall

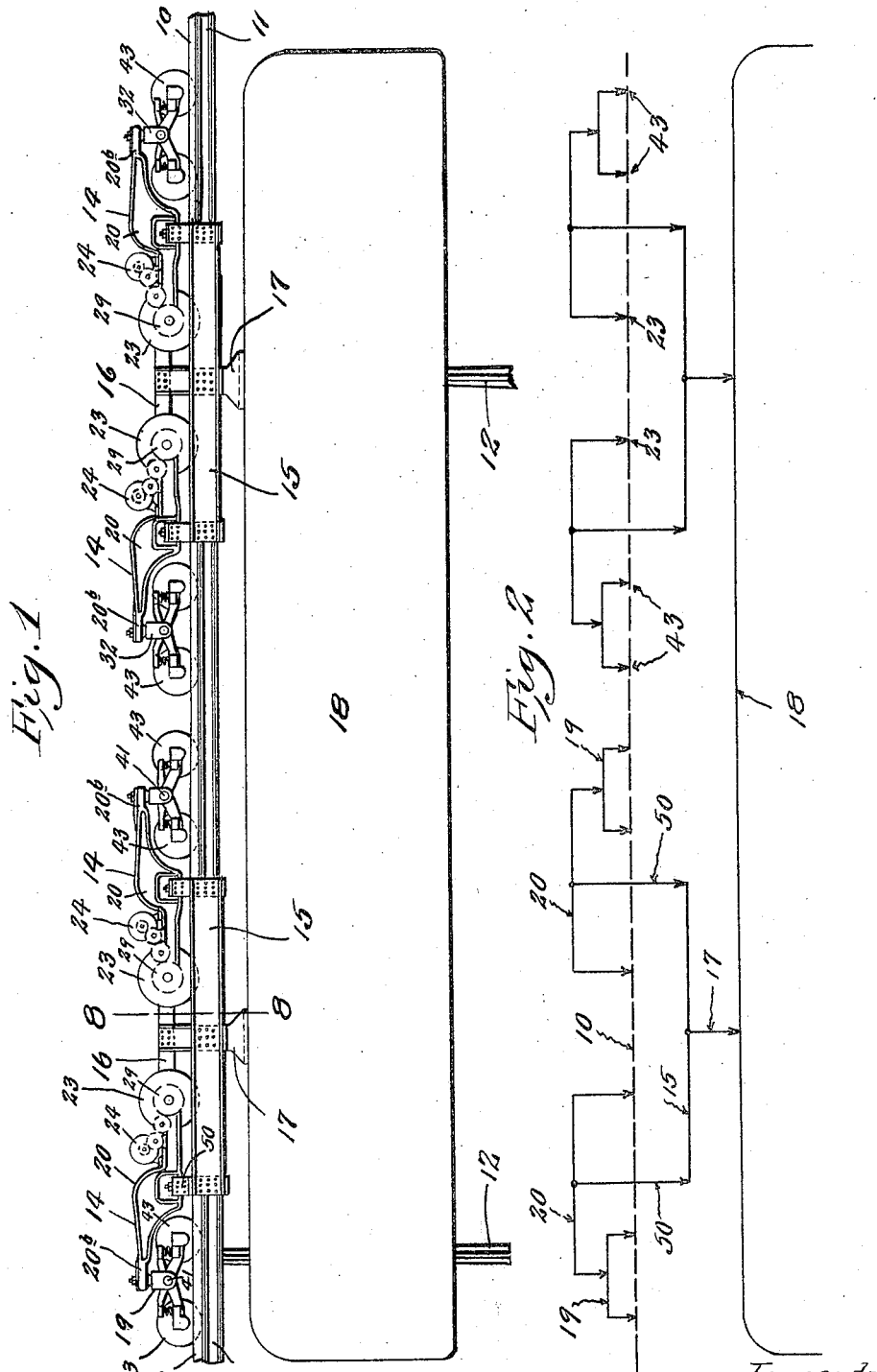
Oct. 9, 1923.
F. R. CORNWALL
MONORAIL SYSTEM
Filed Feb. 17, 1922 — 4 Sheets-Sheet 1
1,469,997

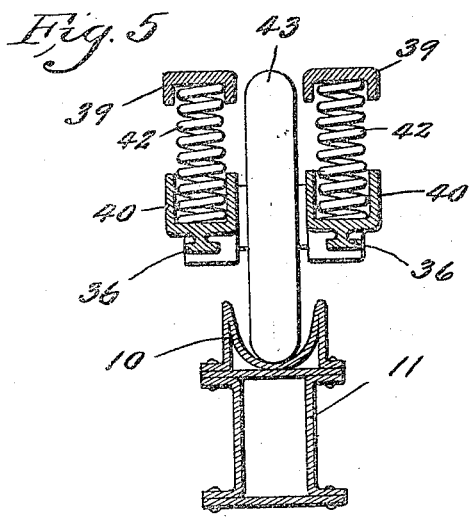
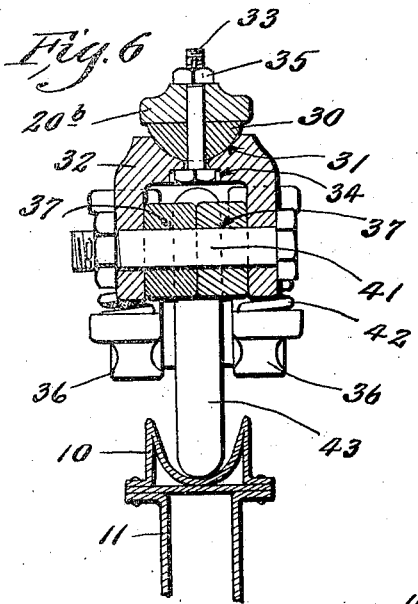
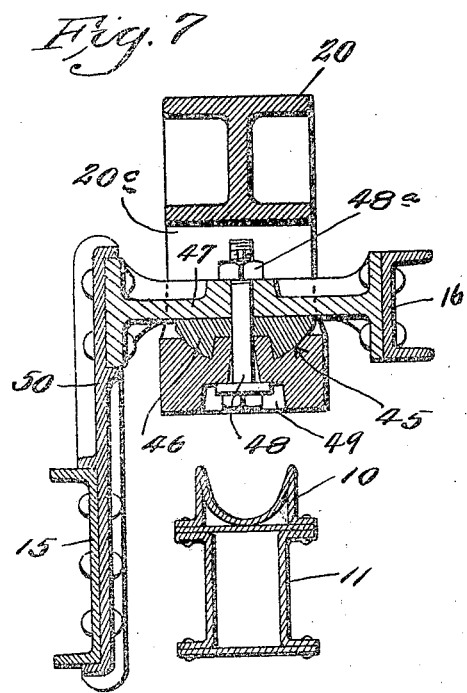
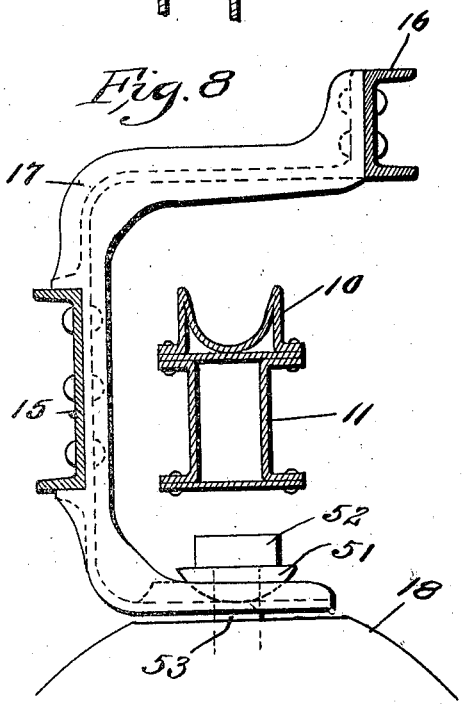

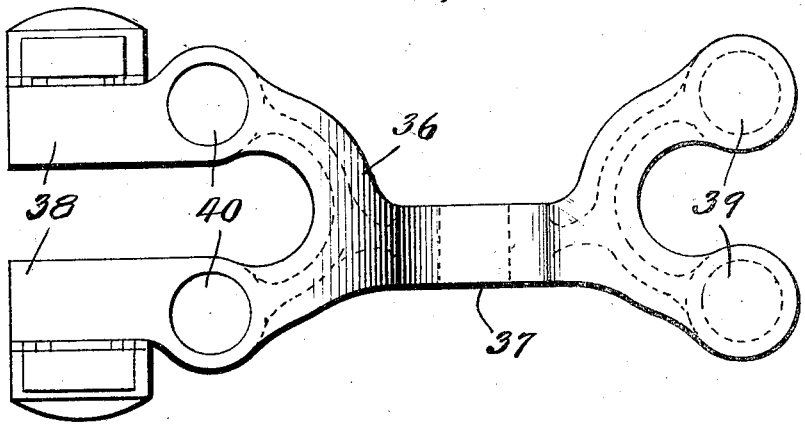
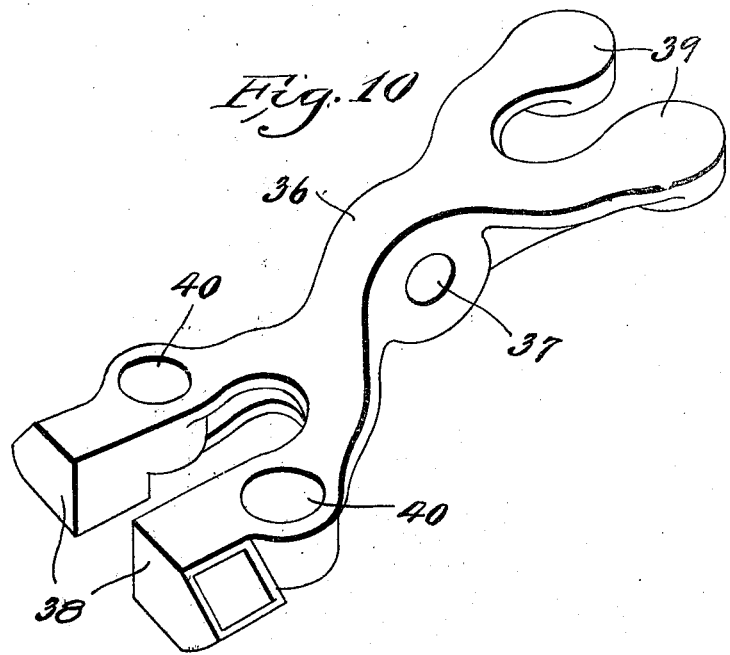

Patented Oct. 9, 1923.

1,469,997

UNITED STATES PATENT OFFICE.

FREDERICK R. CORNWALL, OF ST. LOUIS, MISSOURI; MAY BUSHALL CORNWALL EXECUTRIX OF SAID FREDERICK R. CORNWALL, DECEASED, ASSIGNOR, BY MESNE ASSIGNMENTS, TO MAY B. CORNWALL, OF ST. LOUIS, MISSOURI.

MONORAIL SYSTEM.

Application filed February 17, 1922. Serial No. 537,329.

*To all whom it may concern:*

Be it known that I, FREDERICK R. CORNWALL, a citizen of the United States, residing at the city of St. Louis and State of Missouri, have invented a certain new and useful Improvement in Monorail Systems, of which the following is a full, clear, and exact description, such as will enable others skilled in the art to which it appertains to make and use the same, reference being had to the accompanying drawings, forming part of this application.

This invention relates to new and useful improvements in car trucks for monorail cars, and the objects of the invention are to provide a truck of the class described in which the wheel members of the truck are articulated with each other so that the load is properly distributed to the supporting wheels, and the truck is more flexible.

Further objects of the invention are to pivotally connect the frame members in which are journaled the pilot or trailer wheels and to interpose equalizing operative connections between said frame members whereby the load is equally distributed therebetween.

Still further objects of the invention are to provide a flexible operative connection between said pivotally connected frame members and the main frame of the truck and to provide flexible operative connections between the car supporting member and the respective trucks.

In the drawings,

Figure 1 is a side elevation of a suspended monorail car and the supporting trucks therefor.

Figure 2 is a diagrammatic view showing how the weight of the car is distributed to the various members of the truck.

Figure 3 is a side elevation of one of the car trucks.

Figure 4 is a top plan view of same partly broken away.

Figure 5 is a vertical cross section taken on line 5—5 of Figure 3.

Figure 6 is a vertical cross section taken on line 6—6 of Figure 3.

Figure 7 is a vertical cross-section taken on line 7—7 of Figure 4.

Figur 8 is a vertical cross-section taken on line 8—8 of Figure 1.

Figure 9 is a detail plan view of one of the pivotal wheel members of the car truck.

Figure 10 is a perspective detail view of the same.

Referring by numerals to the accompanying drawings, 10 designates a rail preferably concave in cross-section carried by a boxlike beam-structure 11 which is supported at suitable intervals by towers 12. Operating on and supported by said rail are the wheels of a plurality of monorail car trucks 14, which latter are arranged in two pairs, the members of each pair being flexibly connected by a car-supporting beam 15 and a tie beam 16. Depending from and secured to each beam 15 and 16 is a car-supporting hanger or bracket 17, the lower end of which is secured at a predetermined point to the roof of a suspended car 18. In this manner, each car is supported at two points by hangers 17, and each hanger is fixed to a corresponding car-supporting beam 15 which is suspended at its ends from a corresponding pair of car trucks 14.

Each car truck comprises a pilot or trailer truck 19 and the main truck frame 20. That end of frame 20 which is remote from truck 19 is bifurcated, as indicated at $20^a$, and is provided with journal boxes or bearings 21 in which are journaled ends of axle 22 of a driver wheel 23, which latter occupies a position between the bifurcated end $20^a$ and supports said end of frame 20 in position on rail 10.

A motor 24 is suitably supported on a shelf 25 formed on frame 20 adjacent to bifurcated end $20^a$ and drives through pinion 26 fixed to the shaft motor and idlers 27 and 28 journaled in bearings formed on said frame a large gear 29, which latter is fixed to one end of axle 22 of driver wheel 23.

The opposite end $20^b$ of frame 20 extends towards its respective truck 19 and terminates above said truck at a point which is equidistant from the supporting points of said truck 19. This end $20^b$ is provided with a downwardly presented semispherical ball bearing 30 seated in a socket 31 formed in the upper portion of a saddle member 32. End $20^b$ and ball bearing 30 are apertured to accommodate a bolt 33, the head of which is seated in a recess 34 formed on the underside of the horizontal portion of saddle 32, while the shank of the bolt passes upwardly through socket bearing 31, semispherical bearing 30 and end 20$^b$ and receives a nut 35. Thus, the end 20$^b$ of frame 20 while having a flexible bearing in the upper end of saddle member 32 is held against accidental displacement from its bearing thereon by means of said bolt 33 and nut 35.

Each truck 19, which may perform the functions of a trailer truck or a pilot truck (see Figure 1) consists of two wheel members 36 which are identical in size and shape, but when assembled are oppositely disposed with respect to each other, as shown in Figures 3 and 4. Each wheel piece or member 36 is provided with a horizontally disposed bearing 37 and the ends of each member 36 are bifurcated and offset with respect to its bearing 37, one end, which is provided with journal boxes 38, being located below the plane of said bearing and the opposite end, which is slightly shorter and is provided with downwardly presented spring pockets or seats 39, being located above the plane of bearing 37. The lower end or journal box end of member 36 is provided adjacent to journal boxes 38 with upwardly presented recesses or spring pockets 40. When the two respective wheel members 36 are properly assembled together by means of a king pin or bolt 41, the downwardly presented spring seats 39 of one member are in vertical alinement with the upwardly presented spring pockets 40 of the other member and bear on the upper ends of coiled springs 42 positioned therein. The ends of members 36 are bifurcated in order to clear wheels 43, the axles 44 of which are journaled in journal boxes 38. The lower ends of saddle member 32 extend downwardly a sufficient distance to bring the apertured ends thereof into alinement with bearings 37 in order to be engaged by pin or bolt 41.

Each member 36 is provided with a laterally projecting lug 36$^a$ which occupies a position to one side of saddle member 32 and prevents it from having an excessive rocking movement on bolt 41.

Each frame 20 is provided at a suitable distance from its point of support with a transverse opening or recess 20$^c$ the lower wall of which is provided with a socket bearing 45 with which a semispherical bearing 46 of a transverse member 47 co-operates (see Fig. 7). This member 47 and bearing 46 are held in position on frame 20 by a bolt 48 which projects upwardly through bearing 46 and member 47, and receives a nut 48$^a$ and the head of which bolt occupies a recess 49 formed in the underside of bearing 45. The rear end of transverse member 47 is fixed to one end of tie bar 16, the opposite end of which is secured to the rear end of a transverse member of the adjacent truck. The forward end of transverse member 47 has fixed thereto the upper end of a bracket 50 which extends downwardly and is fixed at its lower end to one end of the member 15, which latter is connected at its opposite end to a similar bracket suspended from the forward end of the transverse member of the adjacent truck.

In Figure 8, I have shown the lower end of bracket 17 provided with a recessed bearing co-operating with a semispherical bearing member 51, which latter supports the head 52 of a king bolt 53 anchored in any suitable way in the roof framing of the car.

In Figure 2, I have illustrated diagrammatically the points of reaction in which the supporting trucks carry the load. The track is indicated by dotted lines 10. The pilot truck 19 supports one end of the truck frame 20, the opposite end of which truck frame is supported by its driving wheel 23. Drivers 23 of each pair of articulated trucks are juxtaposed so that the trailer or pilot wheels, depending upon the direction of travel, being located on each side of the drivers, can best serve their function. The frames 20 pivotally sustain the carrying frames 15 at some predetermined point between the points of support of said frames 20, but preferably at points in which the load imposed upon the frames 20 will be such as to give the drivers sufficient tractive power, while the load supported by the trailer or pilot trucks is divided equally between the two wheels thereof, respectively.

Each supporting frame 17 is preferably connected to the car by rocking bearings, as indicated in Figure 8, the purpose of which is to permit the frame 17 to have a slight swiveling action with respect to the car body, as when the trucks at the front end of the car relative to its direction of movement, take a curve. In this curve-taking operation, referring to Figure 1, it will be seen that the advance or pilot truck will first swing on its pivot, and when both wheels are on the curve and the front end of frame 20 is moved, said frame will carry with it the forward end of the advance frame 15. There is sufficient clearance between the frame members 15, 16, and the frame 20 to permit of this lateral swing. When the front driver takes the curve, the frame 20 will swing further laterally. When the second truck is on the curve, the car body will occupy an angular relation with respect to its front support 17, and this is permissible between these two parts by means of the pivoted bearing heretofore described. This rocking bearing also permits the car body to swing outwardly under the action of centrifugal force in rounding curves. This outward swing, under these conditions, may or may not cause the truck frames to be correspondingly tilted.

However, the pilot or trailer wheels 43 and the driver wheels 23 are mounted in their respective bearings in such a way that each wheel has slight lateral play, which is desirable to prevent flange wear and to permit any of these wheels to be slightly displaced, whereby they may accommodate themselves more readily to curves or slight irregularities in the supporting track. The X-shape trailer or pilot truck frames pivotally connected at their points of intersection and spring supported at their overhanging ends provide an ideal form of truck frame for monorail systems for the reason that the oppositely acting springs located on opposite sides of the horizontal pivotal connection between the frames work in unison, that is, they are arranged in multiple, and by properly positioning the distance of the spring seats from the pivotal point between the frames with relation to the length of the wheel base of the truck, the springs can be made to carry any desired proportion of the load. When weight is imposed through the saddle member 32, the springs 42 on each side of the pivotal point between the frames are equally compressed, and hence the frame members of the truck constitute equalizing devices in and of themselves.

I have not shown the drivers as being mounted in spring supported bearings, but these are well known in the art, and may be used if found desirable. The pivotal relation between the ends of the carrying frames 15 and a pair of truck frames 20 enables each truck frame to swivel bodily with respect to the frame 15, in addition to which the pilot or trailer truck frames swivel independently of the main truck frames 20.

I am aware of the patent to Shoemaker, No. 1,355,801, dated October 12, 1920, for suspended monorail systems, and do not wish to be understood as claiming any of the features shown and described in said Shoemaker patent, but my invention is designed and intended as an improvement thereon and on the type of monorail system described in said patent.

What I claim is:

1. A monorail car truck comprising a pair of wheel members having operative pivotal interengagement, and a main frame provided with bearings for a driver wheel and having flexible operative connection with said pivotally interengaged wheel members.

2. A monorail car truck comprising a pair of frame members pivotally connected together and provided with journal boxes, and a main frame provided with axle bearings and having a flexible operative connection with said frame members, said flexible connection being arranged in a vertical plane with the pivotal connection of said frame members.

3. A monorail car truck comprising a pair of wheel members having equalizing pivotal interengagement, and a main frame provided with bearings for a driver wheel and having flexible operative connection with said wheel members.

4. In a monorail car truck, a pair of frame members pivotally interengaged for relative vertical movement, each of said members being provided at its lower or outer end with a journal box, and having its opposite upper end free, and equalizing yielding means interposed between the free end of each member and the journal box end of the opposite member.

5. In a monorail car truck, a pair of wheel members angularly disposed relative to each other and pivotally connected at their point of intersection, a pair of spaced journal boxes arranged on the lower end of each member, and yielding operative connections between the free upper end of one member and the oppositely disposed end of the other member for distributing the load equally to both of said wheel members.

6. A monorail car truck comprising a pair of wheel pieces angularly disposed relative to each other and pivotally connected at their point of intersection, and resilient means interposed between the opposite ends of the opposite wheel pieces for equalizing the distribution of load thereto.

7. A monorail car truck comprising a pair of wheel pieces pivotally connected, springs interposed between the opposite ends of said wheel pieces for equalizing and yieldingly transmitting the load to said wheel pieces, and a main frame having at one end a ball and socket connection with said pivotal wheel pieces and provided at its other end with a driver wheel.

8. A tandem three-wheel monorail car truck comprising a pair of wheel pieces having an equalizing pivotal relation with each other and a drive wheel frame having an operative flexible connection with said wheel pieces.

9. A tandem three-wheel monorail car truck comprising a pair of wheel pieces having an equalizing pivotal interengagement, a drive wheel frame having a ball and socket connection with said wheel pieces, and a car supporting member having a flexible connection with said drive wheel frame.

10. A tandem wheeled monorail car truck comprising a pair of oppositely disposed wheel members having a pivotal scissors-like movement relative to each other, resilient equalizing connection between the upper end of each wheel member and the lower end of the opposite member, a main frame provided at one end with a driver wheel and at its opposite end with a ball and socket connection with such pivotal wheel members, driving means for said driver wheel, and a car supporting member flexibly suspended from said main frame.

11. A truck having two frame members pivotally connected at their points of intersection, and springs interposed between the overhanging ends of said frame members and their companion frame members.

12. An equalizing truck having intersecting frame members pivotally connected together, and springs interposed between said frame members on each side of said pivotal connection.

13. An equalizing truck comprising intersecting frame members pivotally connected at their points of intersection, springs interposed between the ends of said frame members on each side of said pivotal point, and means for supporting the load in approximately the vertical plane of said pivotal point.

14. A monorail truck consisting of articulated members, a pilot or trailer and driving wheels, said wheels being mounted for lateral movement relative to said truck.

15. A monorail truck comprising a main frame, a pilot truck wheel for supporting one end of the main frame, a driving wheel at the opposite end of said main frame, a load supporting frame carried by said main truck frame, and rocking bearings between said frames.

16. In a monorail system, a load supporting frame, independent main truck frames having individual swiveled connection with said load supporting frame, juxtaposed driving wheels on said main truck frames, and equalizing pilot or trailer truck frames for supporting the outer ends of said main truck frames.

17. In a suspended railway, the combination of a single rail, and two separate and independently movable truck frames, a single driving wheel mounted on each of said frames and supporting its inner end, smaller wheels articulated in pairs at the outer ends of said frames carrying a smaller load than the inner driving wheels, a rigid main frame supported by the truck frames aforesaid, a car, and a hanger by which the car is suspended from the main frame.

18. In a suspended railway, the combination of a single rail, and two separate independently movable truck frames, a single driving wheel supporting the inner end of each of said frames, smaller wheels articulated in pairs at the outer ends of said frames and carrying lighter loads than the larger driving wheels, a motor carried by each of said frames, and gearing between said motors and wheels, respectively.

19. In a suspended railway, the combination of a single rail, two separately movable truck frames, a single driving wheel supporting the inner end of each of said frames, a motor carried by each of said frames, gearing between said motors and driving wheels, respectively, equalized pilot wheels supporting the forward end of the forward frame, and equalized trailer wheels supporting the rear end of the rear frame.

20. In a suspended railway, the combination of a single rail, two independently movable truck frames, a single driving wheel supporting the inner end of each of said frames, a motor carried by each of said frames, gearing between said motors and said driving wheels, respectively, pilot wheels, an articulated frame supported thereby, a pivotal connection between said frame and the forward end of the forward one of the frames first aforesaid, trailer wheels, an articulated frame supported thereby and a pivotal connection between said frame and the rear end of the rear one of the frames first aforesaid.

21. In a suspended railway, the combination of a single rail, a truck having two separate independently movable frames, a single driving wheel supporting the inner end of each of said frames, a main frame supported by and connecting the frames first aforesaid, rocking pivots connecting the frames first aforesaid and the main frame, and swiveling articulated bantam trucks supporting the outer ends of said frames.

22. In a suspended railway, the combination of a single rail, two independently movable truck frames, a single driving wheel mounted in each of said frames, and articulated means swiveled on said frames for supporting their outer ends.

23. In a suspended railway, the combination of a single rail, two trucks having wheels, each of said truck frames being supported at its inner end by one of said wheels, pilot wheels, an articulated frame supported by said pilot wheels and by which the forward end of the forward one of the frames first aforesaid is supported, trailer wheels, and an articulated frame supported by said trailer wheels and by which the rear end of the rear one of the frames first aforesaid is supported.

24. In a suspended railway, the combination of a single rail, two truck frames, each of said truck frames being supported at its inner end by a driving wheel, pilot wheels, an articulated frame supported by said pilot wheels and by which the forward end of the forward one of the two truck frames first aforesaid is supported, a pivot pin connecting said forward end with the articulated pilot wheel frame, trailer wheels, an articulated frame supported by said trailer wheels and by which the rear end of the rear one of the frames first aforesaid is supported, and a pivot pin connecting said rear end of the rear one of the frames first aforesaid and the articulated trailer frame.

25. In a suspended railway, the combination of a single rail, trucks having drive wheels, separate and independently movable truck frames each supported at its inner end by one of said drive wheels, means for supporting its outer end, a main frame supported by the truck frames aforesaid, rocking bearings connecting the main frame and the frames first aforesaid, and a motor carried by each of the frames.

26. In a suspended railway, the combination of a single rail, two trucks each having a large drive wheel adapted to run on said rail, other smaller wheels, separate articulated frames connecting the smaller wheels and one of the larger wheels, a frame mounted upon the separate frames, and a car connected with the latter frames, the wheels being placed so that the larger wheels bear a greater load than the smaller wheels.

27. In a suspended railway, the combination with a single rail, of a pair of trucks including independent frames and each having large drive wheels and other smaller wheels, another frame mounted on the truck frames, and a car depending from and supported by the latter frame by means of rocking bearings, said car having wheeled trucks at each end thereof.

28. In a suspended railway, the combination with a single rail, of a pair of trucks, each truck comprising a pair of large wheels, a plurality of smaller wheels, independent frames connecting the wheels of each truck and arranged to unequally load said wheels, and a frame pivotally mounted upon the wheeled frames with swiveling means to connect the car therewith at both ends of said car.

29. A monorail truck comprising a frame, a single driving wheel supporting one end thereof, and an equalized articulated pilot trailer truck having a plurality of wheels, in tandem, for supporting the opposite end of said frame.

30. Two tandem wheeled trucks, and a load carrying frame straddling said trucks and distributing the load between them, there being rocking bearings between said parts.

31. Two tandem wheeled trucks, and a load carrying frame straddling said trucks and serving as an equalizer for distributing the load between them, there being rocking bearings between said parts.

32. Two tandem trucks whose load is unequally distributed between their supporting wheels, respectively, and a load carrying frame for equally distributing the load between said trucks, there being rocking bearings between said parts.

33. Two tandem trucks whose load is unequally distributed between their supporting wheels, respectively, one wheel in each truck serving as a driver, and supporting the major part of the load transmitted to its truck, a load carrying frame connecting said trucks, and rocking bearings between said parts.

34. A monorail car having a plurality of load bearing frames, each frame having a swiveling truck under each end thereof, and ball and socket bearings connecting said parts.

35. A monorail car having a plurality of load bearing frames, each frame having a swiveling truck under each end thereof, and each swiveling truck having power driving means, there being ball and socket connections between the load bearing frames and trucks.

36. A monorail car having a plurality of load bearing frames, and a plurality of swiveling trucks co-operating with said frames through the medium of ball and socket joints.

37. A monorail car having a plurality of load bearing frames, and a plurality of swiveling trucks co-operating with each end of each of said frames through the medium of ball and socket joints.

38. A monorail car having a plurality of load bearing frames, each frame having a swiveling truck thereunder and co-operating therewith through the medium of ball and socket connections, and non-driving wheels arranged in tandem.

39. A monorail system comprising a track, supports for said track, a car, suspension bars extending from said car and having ball and socket connections therewith, and articulated trucks swiveling independently of each other for pivotally supporting said suspension bars.

40. A monorail system comprising a track, a car, suspension bars extending upwardly from said car, and having ball and socket connections therewith, frames to which said bars are connected by means of rocking bearings, and swiveling trucks for supporting said frames upon said track.

41. A monorail system comprising a track, a car, suspension bars extending upwardly from said car, and having ball and socket connections therewith, frames to which said bars are pivotally connected, and independently swiveling trucks for supporting said frames upon said track, the wheels of said trucks being so disposed that they are unequally loaded.

42. An articulated equalizer supporting system for monorail cars comprising a plurality of vertically articulated tandem wheeled swiveling trucks, there being yieldingly supported means for transmitting the load to the wheels of said trucks.

43. A monorail system comprising a track, a plurality of swiveling motor trucks operatively mounted thereon, a plurality of car-supporting frames rockingly supported by said motor trucks, a car, and suspension rods pivotally mounted on said supporting frames and pivotally connected to said car.

44. Two independently movable articulated tandem trucks whose load is unequally distributed between their supporting wheels, respectively, and a load carrying frame for equally distributing the load between said trucks.

45. Two independently movable articulated tandem trucks whose load is unequally distributed between their supporting wheels, respectively, one wheel in each truck serving as a driver and supporting the major part of the load transmitted.

46. A monorial car having a plurality of load bearing frames, each frame supported at its ends upon independently swiveling truck frames and each truck frame mounted upon independently swiveling wheels.

In testimony whereof I hereunto affix my signature this 14th day of February, 1922.

FREDERICK R. CORNWALL.